(12) United States Patent
Wang et al.

(10) Patent No.: US 8,781,248 B2
(45) Date of Patent: Jul. 15, 2014

(54) IMAGE DETAILS PRESERVATION AND ENHANCEMENT

(75) Inventors: Haiyun Wang, Singapore (SG); Lucas Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 664 days.

(21) Appl. No.: 12/695,220

(22) Filed: Jan. 28, 2010

(65) Prior Publication Data

US 2011/0181787 A1    Jul. 28, 2011

(51) Int. Cl.
*G06T 5/00* (2006.01)
*G06T 5/40* (2006.01)
*G06T 5/50* (2006.01)

(52) U.S. Cl.
USPC ........... 382/274; 382/169; 382/263; 382/264; 348/671; 348/673; 348/678

(58) Field of Classification Search
USPC .......... 382/274, 169, 263, 264; 348/671, 673, 348/674, 678
See application file for complete search history.

(56) References Cited

U.S. PATENT DOCUMENTS

| | | | | |
|---|---|---|---|---|
| 4,204,229 A | * | 5/1980 | Heuze | 348/683 |
| 4,825,297 A | * | 4/1989 | Fuchsberger et al. | 358/447 |
| 5,838,835 A | | 11/1998 | Martens | |
| 5,857,033 A | | 1/1999 | Kim | |
| 5,937,090 A | | 8/1999 | Kim | |
| 6,148,103 A | | 11/2000 | Nenonen | |
| 6,285,413 B1 | | 9/2001 | Akbayir | |
| 6,313,883 B1 | * | 11/2001 | Thaler | 348/630 |
| 6,580,825 B2 | | 6/2003 | Bhaskar | |
| 6,771,320 B2 | | 8/2004 | Choi | |
| 6,771,837 B1 | | 8/2004 | Berbecel et al. | |
| 6,782,137 B1 | | 8/2004 | Avinash | |
| 6,891,892 B2 | | 5/2005 | Yang | |
| 6,915,024 B1 | | 7/2005 | Maurer | |
| 6,965,406 B1 | | 11/2005 | Ueda et al. | |
| 6,992,729 B2 | | 1/2006 | Shirata et al. | |
| 7,003,153 B1 | | 2/2006 | Kerofsky | |
| 7,050,114 B2 | | 5/2006 | Stessen et al. | |
| 7,292,734 B2 | | 11/2007 | Lee et al. | |
| 7,319,787 B2 | * | 1/2008 | Trifonov et al. | 382/168 |
| 7,359,573 B2 | | 4/2008 | Park et al. | |
| 7,602,447 B2 | * | 10/2009 | Arici et al. | 348/687 |
| 8,238,687 B1 | * | 8/2012 | Lim et al. | 382/274 |
| 2006/0284882 A1 | * | 12/2006 | Kerofsky et al. | 345/590 |
| 2009/0252412 A1 | * | 10/2009 | Matsushita | 382/167 |

* cited by examiner

*Primary Examiner* — Michael A Newman
(74) *Attorney, Agent, or Firm* — Wolf, Greenfield & Sacks, P.C.

(57) ABSTRACT

The appearance of image details can be preserved and/or enhanced by applying contrast adaptive gain to the high spatial frequency component of the luminance information. The image details in bright and/or dark regions can be further boosted by applying a local mean adaptive gain. The contrast transfer mapping curve for luminance contrast enhancement can be re-scaled to account for the applied gain. The re-scaling may be performed from frame to frame of displayed video. The re-scaling may be temporally controlled for subsequent frames to make the re-scaling change gradually to prevent flickering.

34 Claims, 7 Drawing Sheets

IMAGE DETAILS PRESERVATION AND ENHANCEMENT

BACKGROUND OF THE INVENTION

1. Field of Invention

The techniques described herein relate generally to enhancement of images and video, and more particularly to preserving and/or enhancing image details when performing luminance contrast enhancement (LCE).

2. Discussion of the Related Art

Digital images may contain pixels that each have associated luminance and chrominance information. Luminance information represents the pixel brightness and chrominance information represents pixel color.

The contrast of an image represents the luminance difference between the dark portions of an image and the light portions of the image. Luminance contrast enhancement (LCE) is a technique for improving image quality by changing the contrast of an image. Changing the contrast of an image by LCE may improve a person's visual perception of the image by accentuating the difference between light and dark portions of an image. Common LCE techniques adjust the luminance levels within the image to fit within the available dynamic range of the application. For example, the contrast may be increased/expanded for a system with high dynamic range, or decreased/compressed for a system with low dynamic range. LCE may use a contrast transfer mapping curve stored in a lookup table to map the current image luminance levels onto new luminance levels. The mapping curve may be linear or non-linear, and may be tailored to a particular application.

SUMMARY OF THE INVENTION

Some embodiments relate to a method of processing an image comprising a plurality of pixels having luminance information associated therewith. The luminance information may be processed to generate first components of the luminance information and second components of the luminance information. The first components correspond to a higher spatial frequency than that of the second spatial frequency components. A contrast transfer mapping is applied to the second components of the luminance information using contrast transfer mapping information. It is determined, based on the contrast transfer mapping information, whether to apply gain to the first components of the luminance information. Gain is applied to the first components of the luminance information, when it is determined to do so.

Some embodiments relate to a method of processing an image comprising a plurality of pixels having luminance information associated therewith. The luminance information may be processed to generate first components of the luminance information and second components of the luminance information. The first components correspond to a higher spatial frequency than that of the second spatial frequency components. Local mean luminance values of the luminance information may be calculated. Gain may be applied to the first components of the luminance information based on the local mean luminance values, wherein higher gain is applied to first components of the luminance information having more extreme corresponding local mean luminance values.

Some embodiments relate to a method of processing video comprising a plurality of images in frames of the video. The images each have a plurality of pixels having luminance information associated therewith. A contrast transfer mapping is applied to first luminance information for a first frame of the video. The contrast transfer mapping is re-scaled based on luminance information for the first frame and the second frame of the video to produce a second contrast transfer mapping. The second contrast transfer mapping is applied to second luminance information for the second frame of the video.

Some embodiments relate to a computer readable storage media having computer executable instructions, which, when executed, perform one or more of the methods described herein.

Some embodiments relate to a device for processing an image comprising a plurality of pixels having luminance information associated therewith. The device includes a sub-band separation module that separates the luminance information to generate first components of the luminance information and second components of the luminance information. The first components correspond to a higher spatial frequency than that of the second spatial frequency components. The device also includes a contrast transfer mapping module that applies a contrast transfer mapping to the second components of the luminance information using contrast transfer mapping information. The device further includes a contrast adaptive gain module that determines, based on the contrast transfer mapping information, whether to apply gain to the first components of the luminance information, and applies gain to the first components of the luminance information, when it is determined to do so.

Some embodiments relate to a device for processing an image comprising a plurality of pixels having luminance information associated therewith. The device includes a sub-band separation module that separates the luminance information to generate first components of the luminance information and second components of the luminance information. The first components correspond to a higher spatial frequency than that of the second spatial frequency components. The device may further include a mean-adaptive gain generation module that applies a second gain to the first components of the luminance information based on local mean luminance values of the luminance information Higher gain may be applied to first components of the luminance information having more extreme corresponding local mean luminance values.

Some embodiments relate to a device for processing an image comprising a plurality of pixels having luminance information associated therewith. The device includes a sub-band separation module that separates the luminance information to generate first components of the luminance information and second components of the luminance information. The first components correspond to a higher spatial frequency than that of the second spatial frequency components. The device may also include a contrast transfer mapping module that applies a contrast transfer mapping to the second components of the luminance information using contrast transfer mapping information. The device may further include a frame-based detail boost module that re-scales the contrast transfer mapping by processing the contrast transfer mapping information. The image may be included in a frame of video. The contrast transfer mapping information may be re-scaled gradually from frame to frame of the video.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the invention. In the drawings.

DETAILED DESCRIPTION

One problem with conventional Luminance Contrast Enhancement (LCE) is that it can degrade the appearance of details within an image. For example, small features of the image may be less perceptible after LCE processing. Examples of this type of problem are shown in FIGS. 1 and 2.

Figure 1A:
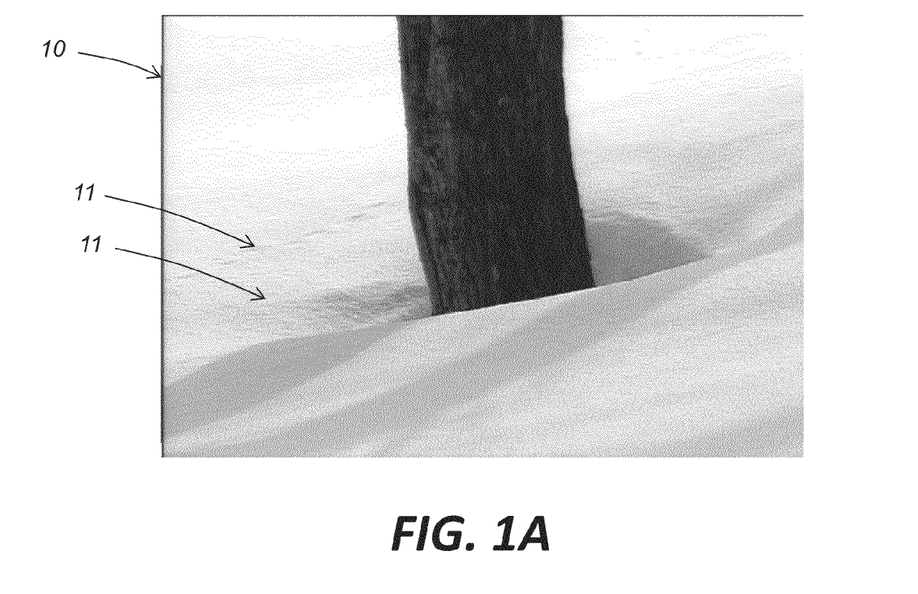
FIGS. 1A and 1B show examples of images before and after applying conventional LCE processing with high contrast enhancement strengths.
Figure 1B:
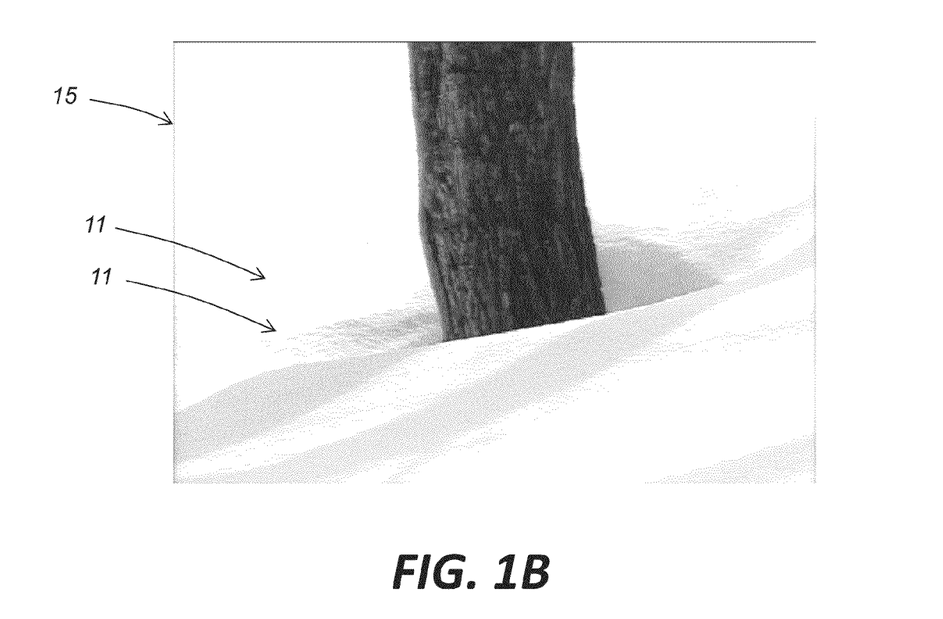

FIG. 1A shows an example of an image 10 prior to performing LCE. Image 10 includes regions 11 with detailed texture. FIG. 1B shows image 15 which corresponds to image 10 after performing LCE. As shown in FIG. 1B, the detailed texture of regions 11 is less visible in image 15 after performing LCE. The detailed regions 11 have a washed-out appearance in image 15.

Figure 2A:
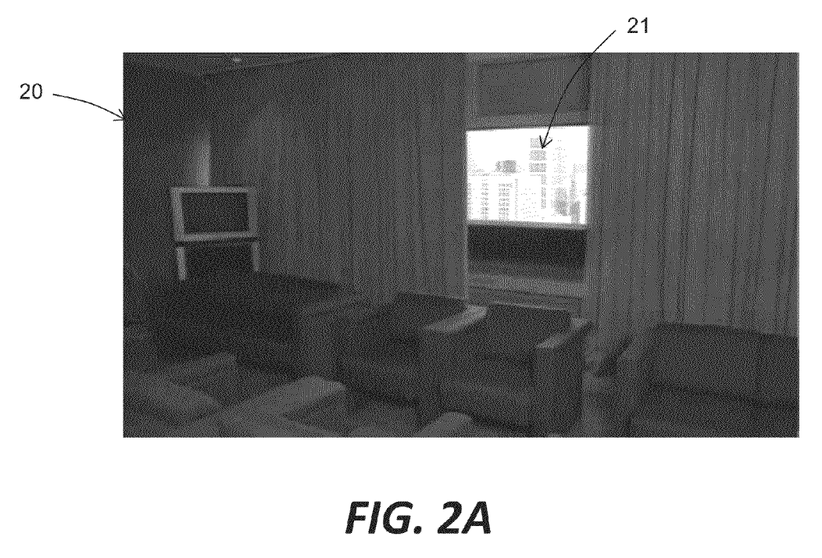
FIGS. 2A and 2B show further examples of images before and after applying conventional LCE processing with high contrast enhancement strengths.
Figure 2B:
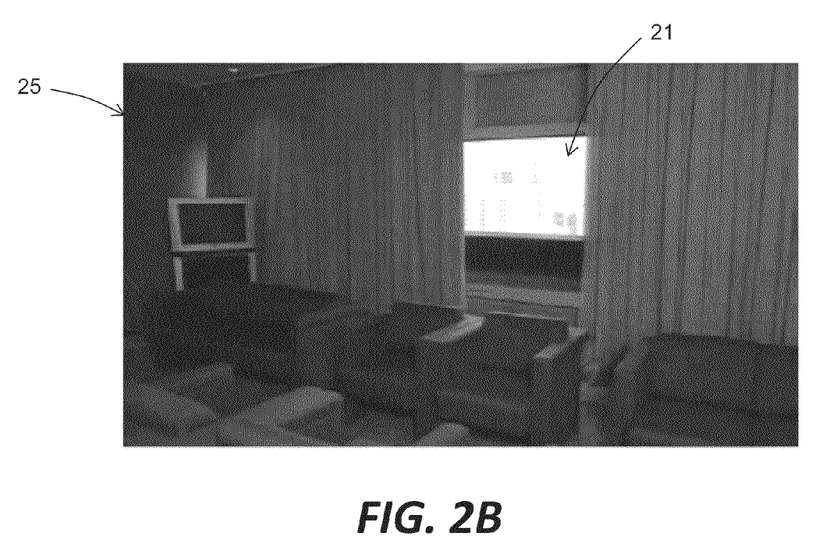

FIG. 2A shows another example of an image 20 prior to performing LCE. Image 20 shows a display 21 that includes relatively small features. FIG. 2B shows image 25 which corresponds to image 20 after performing LCE. As shown in FIG. 2B, the detail in display 21 is less visible in image 25 after performing LCE.

Described herein are inventive techniques for preserving and/or enhancing the detailed visual content of an image. These techniques may be performed in connection with performing LCE, thereby boosting the details and/or compensating for the loss of details caused by LCE.

Figure 3:
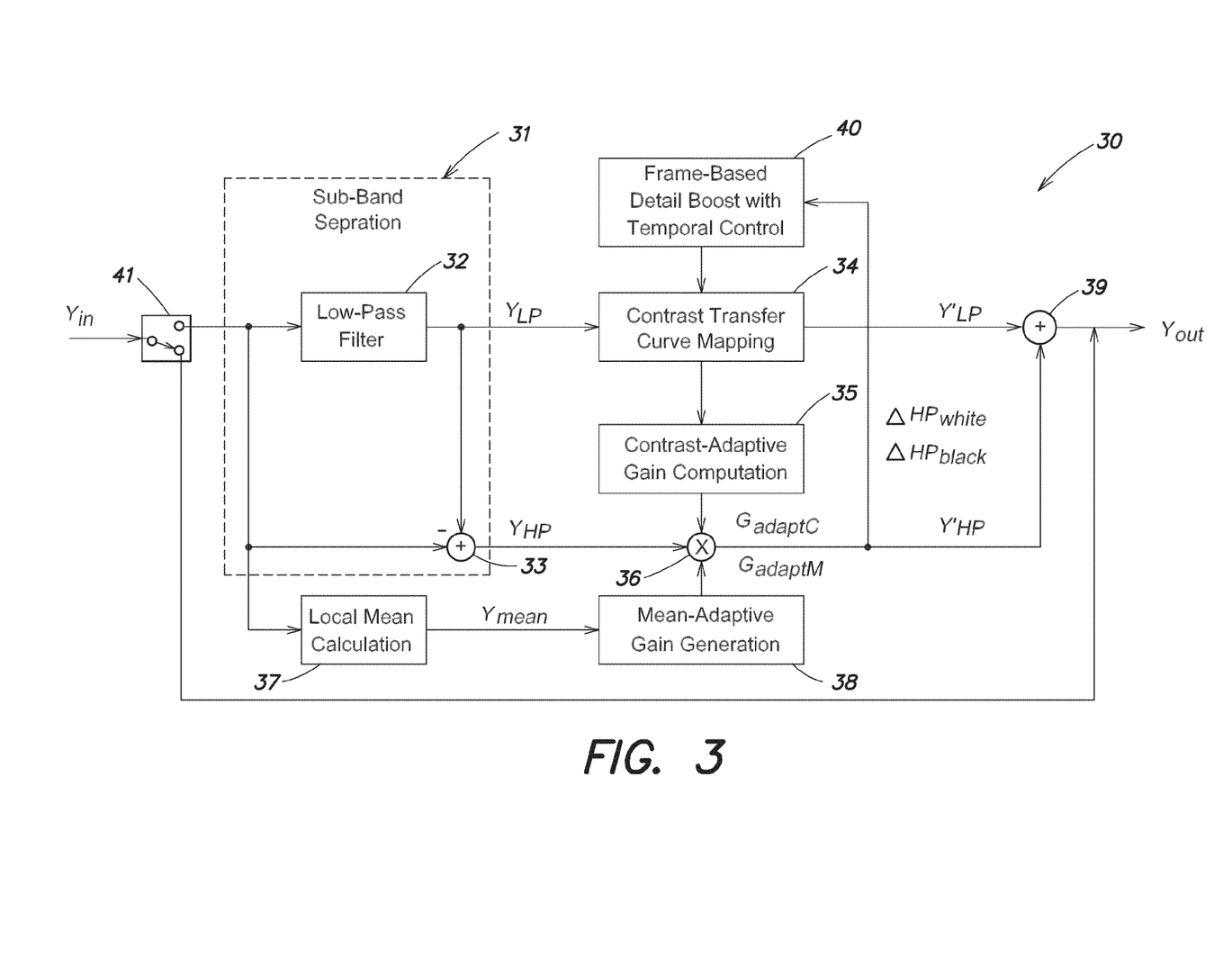
FIG. 3 shows a block diagram of a system for preserving and/or enhancing the details of an image when performing LCE, according to some inventive embodiments.

FIG. 3 shows a block diagram of a system 30 for preserving and/or enhancing the details of an image when performing LCE. System 30 may include a sub-band separation module 31, a spatial low-pass filter 32, an adder/subtractor 33, a contrast transfer curve mapping module 34, a contrast-adaptive gain computation module 35, a multiplier 36, a local mean calculation module 37, a mean-adaptive gain generation module 38, an adder 39, and a frame-based detail boost module 40. System 30 may optionally include a bypass switch 41 that allows the processing of system 30 to be bypassed such that the input $Y_{in}$ is directly provided to the output as $Y_{out}$.

System 30 may receive as input the luminance information $Y_{in}$ for an image. The luminance information $Y_{in}$ may include an array or matrix of luminance values, each of which corresponds to an individual pixel of the image. The luminance value of a pixel may represent the brightness or intensity of the pixel. Images often have regions of different luminance values corresponding to lighter regions and darker regions. For example, a high luminance value may correspond to a bright pixel within the image and a low luminance value may correspond to a dark pixel within the image. In some embodiments, the luminance values may be represented as digital values having a plurality of bits. For example, the luminance values may be represented by eight bit digital words corresponding to the range of integers from 0 to 255. However, any suitable range of luminance values and number of bits may be used. The luminance values $Y_{in}$ may be represented in any suitable way, as the invention is not limited in this respect.

Sub-band separation module 31 may process the luminance values $Y_{in}$ to obtain luminance information having selected spatial frequency components of luminance information $Y_{in}$. The spatial frequency components of the luminance information may relate to the representation of the luminance information $Y_{in}$ in the frequency domain based on a two-dimensional spatial Fourier transform of the luminance information $Y_{in}$. However, it should be appreciated that the Fourier transform is described as a conceptual framework for understanding the spatial frequency components, and the Fourier transformation need not be calculated, as the luminance information $Y_{in}$ may naturally include various spatial frequency components. The lower-frequency spatial components of an image may include the information about large regions within the image and the higher-frequency spatial components may include information about the detailed regions of an image. In some embodiments, separating the high spatial frequency and low spatial frequency components of the luminance information for an image may enable performing different processing for different frequency components. For example, the high spatial frequency components may be processed differently from the low frequency components to preserve and/or enhance the image details included in the high spatial frequency components of the luminance information.

The sub-band separation module 31 may use one or more filters to attenuate some spatial frequency components of the luminance information. For example, sub-band separation module 31 may include a spatial low-pass filter 32 that attenuates the high frequency spatial components $Y_{HP}$ of the luminance information and passes the low frequency spatial components $Y_{LP}$. For example, low-pass filter 32 may be a 7×7 FIR (finite impulse response) filter with equal weights (e.g., an average filter). However, it should be appreciated that the low-pass filter may be implemented in a variety of ways. In system 30, the high frequency spatial components $Y_{HP}$ of luminance information $Y_{in}$ can be obtained by subtracting the low frequency spatial components $Y_{LP}$ from the luminance information $Y_{in}$ using adder/subtractor 33. It should be appreciated, however, that various other techniques may be used to separate the frequency components of the luminance information, and the invention is not limited to the particular separation technique shown in FIG. 3. For example, a high-pass or bandpass filter may be used, or a combination of filters, to obtain the desired frequency components of the luminance information. In some implementations, the spatial frequency components may be split into low-pass, band-pass and high-pass components, using any suitable filtering/separation technique.

System 30 may include a contrast transfer curve mapping module 34 that performs luminance contrast enhancement (LCE). Any suitable contrast mapping may be performed to enhance the contrast of an image, including known LCE techniques. The contrast transfer mapping may be performed by module 34 to adjust or normalize the luminance values of an image to the dynamic range of the particular system used to display the image. For example, an image may have a range of luminance values when it is initially received by a device. The range of luminance values may then be expanded or contracted to suit the dynamic range of the particular system used to display the image. For example, televisions of different technologies are available, such as cathode-ray tube (CRT), plasma, liquid crystal display (LCD), and light-emitting diode (LED) technologies, which can be made by different manufacturers. These televisions may have different dynamic ranges corresponding to the range of possible luminance values that the television can display. Televisions that have a high dynamic range may increase the contrast of a received image by adjusting the luminance values to make the dark portions of the image darker and the light portions of the image lighter. Televisions with low dynamic range may need to decrease the contrast of the image so that the dynamic range of the television is not exceeded.

The contrast transfer mapping performed by module 34 may be linear or non-linear. When the contrast transfer mapping is linear, the luminance values within the image each may be adjusted by the same amount (e.g., multiplied by the same constant) to correspondingly increase or decrease the contrast. When the contrast transfer mapping is non-linear, some luminance values may be changed to a greater degree than other luminance values. The shape of the contrast transfer mapping curve may be selected using conventional techniques to optimize the contrast of an image according to the application. It should be appreciated that any suitable contrast transfer mapping may be used, as the invention is not limited to any particular contrast transfer mapping.

As shown in FIG. 3, the low spatial frequency component $Y_{LP}$ of the luminance information may be provided as an input to contrast transfer curve mapping module 34. In some embodiments, luminance contrast enhancement (LCE) is performed on the low spatial frequency component $Y_{LP}$ of the luminance information by contrast transfer curve mapping module 34 using a contrast transfer mapping curve.

Figure 4:
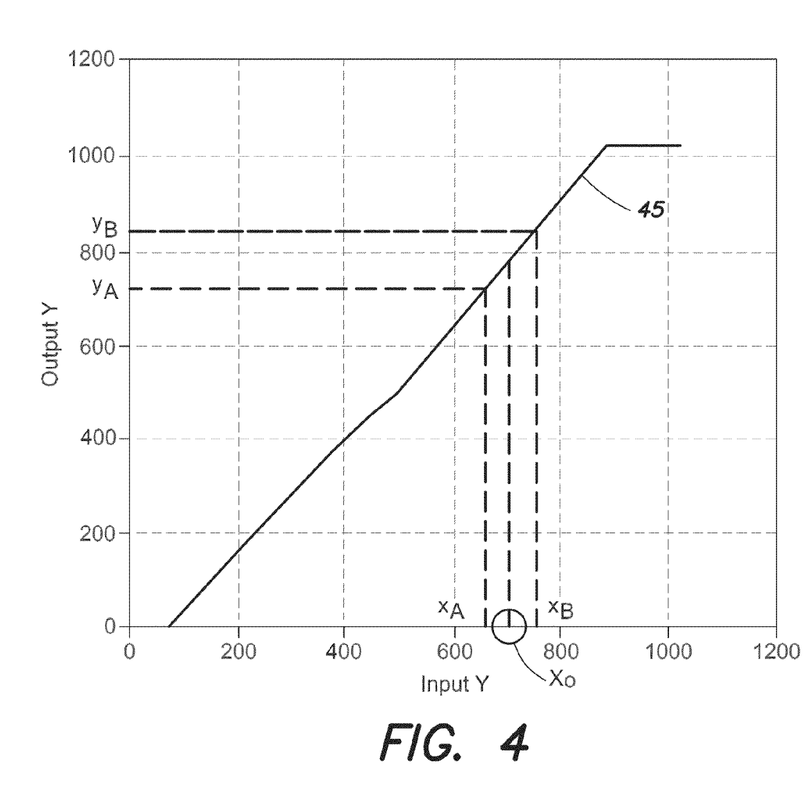
FIG. 4 shows an example of a contrast transfer mapping curve.

FIG. 4 shows an example of a luminance transfer curve 45 that maps the input luminance level on the horizontal axis to the output luminance level on the vertical axis, to perform LCE. It should be appreciated that the luminance transfer curve 45 is merely one example of a luminance transfer curve, and any suitable luminance transfer curve may be used. In some embodiments, the luminance transfer mapping may be performed using a lookup table, although any suitable type of mapping may be performed.

In some inventive embodiments, the details of the image may be preserved and/or boosted by a contrast-adaptive gain computation module 35 (FIG. 3). Contrast-adaptive gain computation module 35 may calculate the amount of gain to apply to individual pixels of the high spatial frequency component $Y_{HP}$ of the luminance information to preserve and/or enhance the details of the image. The gain may be determined for each pixel based on the contrast transfer curve and the luminance of the corresponding pixel. For example, the gain may be determined based on the corresponding local slope (e.g., tangent) of the contrast transfer curve at the luminance of a given pixel. The low spatial frequency component of the luminance information $Y_{LP}$ or the luminance information $Y_{in}$ may be used to determine the position on the contrast transfer curve. If the local slope indicates that the LCE transfer mapping will improve the details contrast at the pixel's luminance value, then the corresponding gain on the contrast transfer mapping curve may be applied to the high pass spatial component $Y_{HP}$ of the luminance information to correspondingly boost the contrast of the details. For example, if the local slope of the contrast transfer curve is greater than one, gain may be applied to the pixel according to the luminance transfer mapping to correspondingly boost the details of the image carried by the high frequency spatial component $Y_{HP}$ of the luminance information. If the local slope of the contrast transfer curve indicates that the contrast transfer mapping will not improve the details contrast for the pixel's luminance value, then the gain may be set equal to one to preserve the details. For example, if the local slope of the contrast transfer curve is equal to one or less than one, the luminance transfer mapping may not be applied to the pixel by module 34, and the gain for the corresponding pixel $X_0$ may be set equal to one (or another constant) to preserve the detail of the image in $Y_{HP}$.

These calculations may be expressed arithmetically as:

$$\begin{cases} G_{adaptC} = \dfrac{|y_B - y_A|}{|x_B - x_A|} \cdot K, & \text{if } x_B \neq x_A \text{ and } |y_B - y_A| > |x_B - x_A| \\ G_{adaptC} = 1, & \text{if } |y_B - y_A| \leq |x_B - x_A| \end{cases}$$

where $G_{adaptC}$ is the gain to be applied to the high spatial frequency component $Y_{HP}$ of the luminance information for a given pixel, and $(x_A, y_A)$ and $(x_B, y_B)$ are points on the luminance transfer curve that may be chosen to be near to and on either side of the selected pixel's luminance value $X_0$, for example, as shown in FIG. 4. As shown in the expressions above, the contrast-adaptive gain may be applied when the slope of the contrast transfer mapping curve is greater than one, e.g., when $|y_B - y_A| > |x_B - x_A|$. These calculations may be performed for each pixel of the image and/or each luminance value of the image to determine the contrast-adaptive gain to apply to each pixel, as the gain calculation may be different depending on the luminance of each pixel and the local slope of the contrast transfer mapping curve at the corresponding luminance. The corresponding gain $G_{adaptC}$ may be calculated using the local slope of the contrast transfer curve, or by using the corresponding mapping at the pixel's luminance value on the transfer mapping curve, for example. Optionally, the applied gain may be multiplied by a control parameter K, which may be selected by the user to control the contrast, in some implementations. Multiplier 36 may multiply individual pixels of the high spatial frequency component $Y_{HP}$ of the luminance information by the corresponding gain $G_{adaptC}$ determined for each pixel. Any suitable technique may be used to apply the determined gain to $Y_{HP}$.

The Applicants have recognized and appreciated that the appearance of an image can be improved by enhancing the appearance of the details that appear in the darkest and brightest regions of an image. In some inventive embodiments, gain is applied to the high spatial frequency component $Y_{HP}$ of the luminance information in the brightest and/or darkest regions of the image. A local mean calculation module 37 and mean-adaptive gain generation module 38 (FIG. 3) may be used to calculate the gain to be applied to $Y_{HP}$ based on the mean value of luminance within a region of the image. Local mean calculation module 37 may calculate the local mean representing the average luminance in the region around a given pixel. For example, local mean calculation module 37 may calculate the average luminance value over a window of pixels in the vicinity of a given pixel. Any suitable size and shape of window may be used. For example, a square 3×3 or 7×7 window may be used in some implementations. The window may be centered around the current pixel for which the local mean is to be calculated. The process may be repeated for each pixel of the image by shifting the window accordingly. The local mean calculation module 37 may calculate an array or matrix of values representing the corresponding local mean luminance values for the image.

Figure 5:
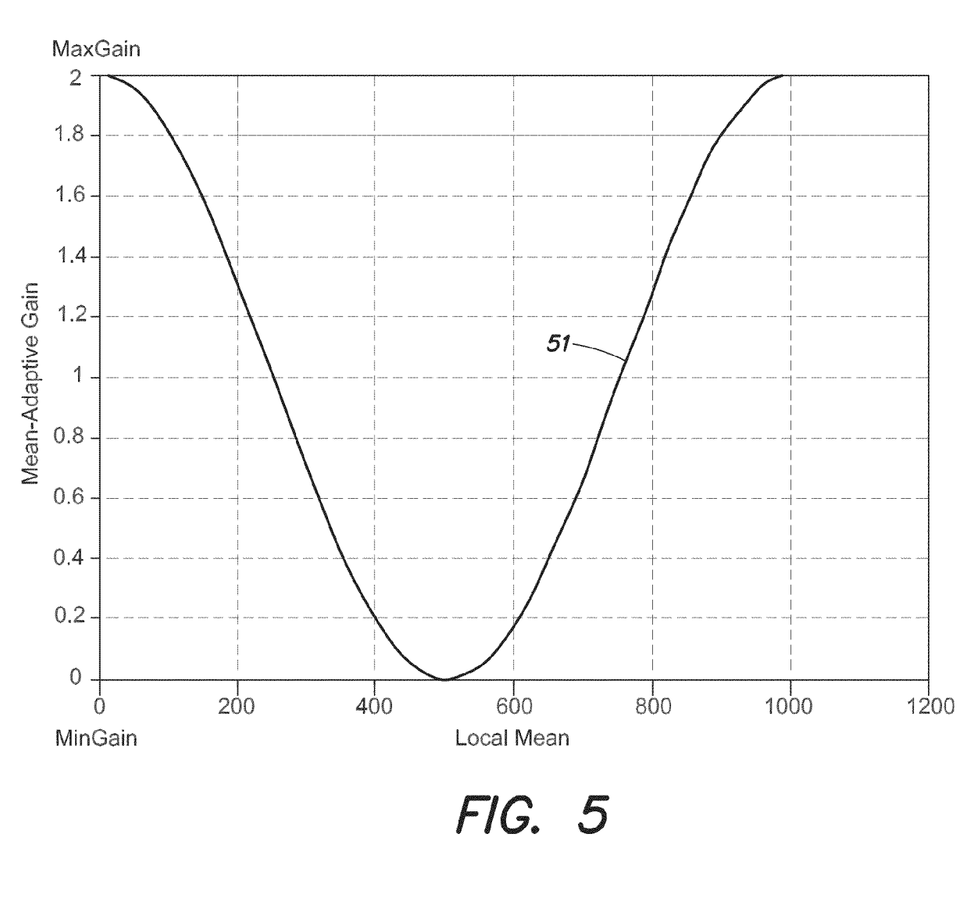
FIG. 5 shows an example of a function for calculating a local mean-adaptive gain, according to some embodiments.

The local mean values may be provided to mean-adaptive gain $G_{adaptM}$ generation module 38, which may calculate the gain to be applied to each pixel of $Y_{HP}$ based on the corresponding local mean luminance value. A higher mean-adaptive gain may be applied to regions of the image with very high and/or very low local mean luminance, and a lower mean-adaptive gain may be applied to regions of the image having a moderate local mean luminance value. Mean-adaptive gain generation module 38 may apply a function or lookup table to determine the gain to be applied to each pixel of $Y_{HP}$ based on the corresponding local mean luminance value. In some embodiments, a cosine-shaped or V-shaped function may be used, such as:

$$G_{adaptM} = \cos(\text{Mean}/160) + 1$$

where Mean∈[0,1023]

in an implementation with ten-bit luminance values. This cosine function 51 is illustrated in FIG. 5, which shows that higher gain is used for the darkest and brightest portions of the image than for regions of moderate brightness. Any suitable function may be used to enhance the detail levels in the darkest and/or brightest portions of the image. Multiplier 36 may multiply respective pixels of $Y_{HP}$ by the mean adaptive gain $G_{adaptM}$ calculated for each pixel.

After applying the luminance contrast mapping to $Y_{LP}$ to produce $Y'_{LP}$ and applying gain to $Y_{HP}$ to produce $Y'_{HP}$, these modified components of the luminance information $Y'_{LP}$ and $Y'_{HP}$ may be added together by adder 39 (FIG. 3) to produce the processed luminance information $Y_{out}$ which may be used for display of the image. However, as shown in FIG. 6, the application of gain to the high spatial frequency component $Y_{HP}$ of the luminance information may cause the output luminance information $Y_{out}$ to exceed the available dynamic range.

Figure 6:
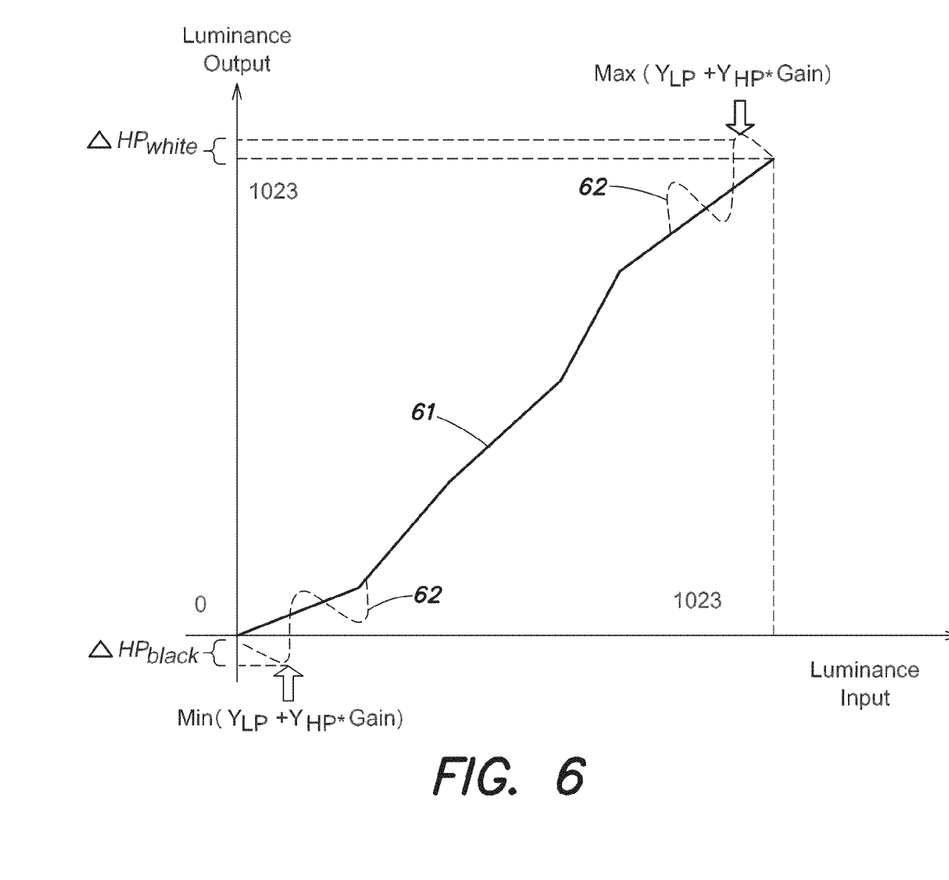
FIG. 6 is a graph showing the effect on the range of luminance values of applying gain to the high spatial frequency components of the luminance information.

FIG. 6 shows a contrast transfer mapping curve 61 that may be applied to the low spatial frequency component $Y_{HP}$ of the luminance information. FIG. 6 also shows a curve 62 representing the sum of $Y'_{LP}$ and $Y'_{HP}$. As shown in FIG. 6, curve 62 may include portions that extend above the allowed maximum value of luminance or below the allowed minimum value of luminance, e.g., beyond the available dynamic range. As shown in FIG. 6, curve 62 extends below the allowed minimum luminance value by the amount $\Delta HP_{black}$. Curve 62 also extends above the allowed maximum luminance value by the amount $\Delta HP_{white}$. To address this issue, the contrast transfer mapping curve may be re-scaled so that the resulting luminance values $Y_{out}$ fit within the available dynamic range. For example, the contrast transfer curve may be re-scaled so that curve 62 does not extend beyond the allowed maximum and minimum luminance values. The re-scaling may be performed by frame-based detail boost module 39. The re-scaling may be performed in any suitable way. As one example, a global gain A and an offset B may be applied to the contrast transfer mapping curve X, such that X'=AX+B. In some embodiments, A and B may be calculated using the following equations, $$\because A \cdot LUT_{Range} + B = LUT_{Range} - \Delta HP_{white} - \Delta HP_{black}$$

$$\because \text{Let } B = \Delta HP_{black}$$

$$\therefore A = 1 - \frac{\Delta HP_{white} + 2 \cdot \Delta HP_{black}}{LUT_{Range}}$$

where $LUT_{Range}$ is the range/number of available luminance values (e.g., $LUT_{Range}$=1024 for ten-bit luminance information). A re-scaled contrast transfer curve can thus be calculated based on the calculated A and B values. The rescaled curve may be applied to $Y_{LP}$ by contrast transfer mapping module 34.

Applicants have recognized and appreciated that the rescaling of the contrast transfer mapping curve may change from frame to frame when video information is being processed. For example, suitable A and B values may be calculated for a first image frame, and then the scene may change in another frame such that that different values of A and B are calculated. Changing the re-scaling quickly may cause the video to flicker in an undesirable manner.

In some embodiments, temporal stabilization of the contrast transfer curve re-scaling may be applied. For example, the A and B values may be temporally controlled so that they are only allowed to change gradually in a subsequent frame to avoid flicker. For example, negative feedback with proportional control may be used to stabilize the A and B values.

Figure 7:
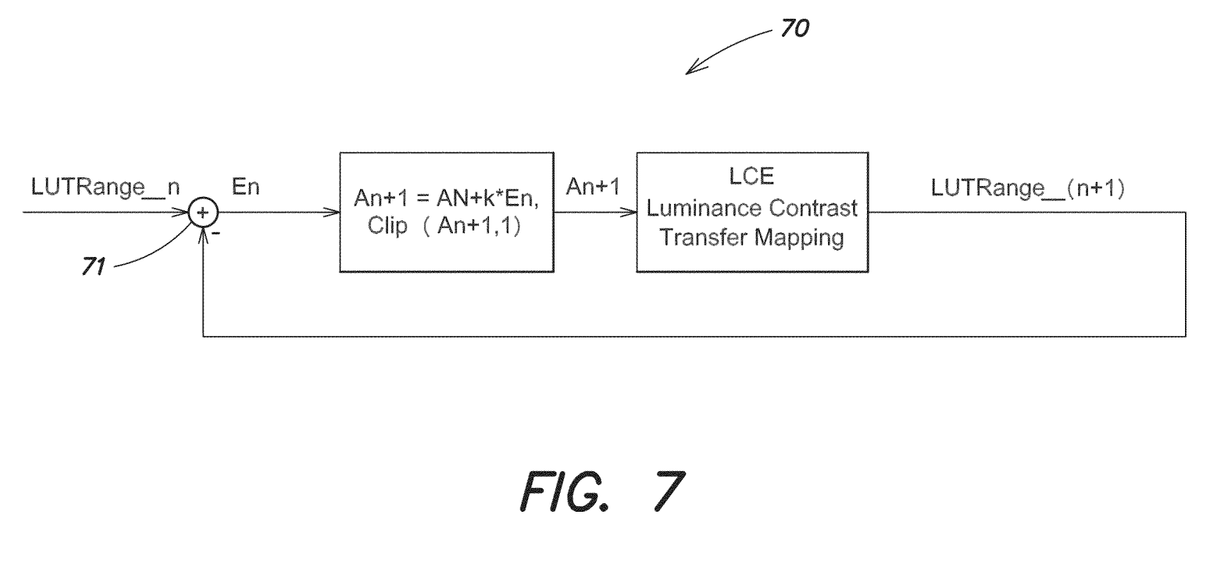
FIG. 7 shows an example of a feedback loop for stabilizing the output range of the contrast transfer mapping curve, according to some embodiments.

FIG. 7 shows a diagram of a feedback loop 70 for stabilizing the value of A, according to some embodiments. Feedback loop 70 receives as input the range of luminance values $LUT_{Range\_n}$ in the contrast transfer mapping curve for frame n. Adder/subtractor 71 may subtract the range of luminance values $LUT_{Range\_n+1}$ from $LUT_{Range\_n}$ to determine an error signal En representing the frame-to-frame difference in the range of the contrast transfer mapping curve. The new value $A_{n+1}$ is then calculated as $A_{n+1} = A_n + K \cdot En$, where K is a proportional gain. The value $A_{n+1}$ may be clipped to be no larger than one. The contrast transfer mapping curve may then be re-scaled according to the new value of A. The values of A and B may be calculated using the following equations.

$$A_{n+1} \cdot LUT_{Range} + B_{n+1} = A_n \cdot LUT_{Range} + B_n - \Delta HP_{white\_(n+1)} - \Delta HP_{black\_(n+1)}$$

$$B_{n+1} = (A_n - A_{n+1}) \cdot LUT_{Range} - (\Delta HP_{white\_(n+1)} + \Delta HP_{black\_(n+1)}),$$

The above-described embodiments of the present invention and others can be implemented in any of numerous ways. For example, the embodiments may be implemented using hardware, software or a combination thereof. When implemented in hardware, any suitable image processing hardware may be used, such as general-purpose or application-specific image processing hardware which may be included in a television, monitor, or other display apparatus, for example. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that some implementations of the embodiments of the present invention include at least one tangible computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

FIG. 3 shows an embodiment of a system that implements several different inventive aspects using a plurality of modules. It should be appreciated that some embodiments may use only one or more of the inventive aspects disclosed herein, and the invention is not limited to the combination of these aspects illustrated in FIG. 3.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of processing an image comprising a plurality of pixels having luminance information associated therewith, the method comprising:
    processing the luminance information to generate first components of the luminance information and second components of the luminance information, wherein the first components correspond to a higher spatial frequency than that of the second components;
    applying a contrast transfer mapping to the second components of the luminance information using contrast transfer mapping information;
    determining, based on the contrast transfer mapping information, whether to apply the contrast transfer mapping to the first components of the luminance information; and
    applying the contrast transfer mapping to the first components of the luminance information, when it is determined to do so.

2. The method of claim 1, wherein processing the luminance information comprises spatially filtering the luminance information.

3. The method of claim 1, wherein determining whether to apply the contrast transfer mapping to the first components of the luminance information comprises determining if the contrast transfer mapping increases details contrast for a corresponding luminance value of the image.

4. The method of claim 1, wherein determining whether to apply the contrast transfer mapping to the first components of the luminance information comprises calculating a slope of the contrast transfer mapping information for a corresponding luminance value of the image.

5. The method of claim 4, wherein the contrast transfer mapping is applied to the first components when the slope is greater than one.

6. The method of claim 5, wherein a gain applied by applying the contrast transfer mapping corresponds to the slope of the contrast transfer mapping information.

7. A computer readable storage device having computer executable instructions, which, when executed, perform the method of claim 1.

8. The method of claim 1, wherein determining whether to apply the contrast transfer mapping to the first components of the luminance information comprises selecting points of the contrast transfer mapping local to a luminance value for a selected pixel, wherein selecting the points comprises selecting a first point having a first x-coordinate $x_a$ and a first y-coordinate $y_a$ and a second point having a second x-coordinate $x_b$ and a second y-coordinate $y_b$, wherein the contrast transfer mapping is applied when $|y_b-y_a|>|x_b-x_a|$.

9. The method of claim 1, wherein the method determines whether to apply the contrast transfer mapping for each pixel of the image.

10. The method of claim 1, further comprising:
    calculating local mean luminance values of the luminance information; and
    applying gain to the first components of the luminance information based on the local mean luminance values, wherein higher gain is applied to first components of the luminance information having more extreme corresponding local mean luminance values.

11. The method of claim 10, wherein each local mean luminance value is calculated by determining a mean value of the luminance information over a subset of pixels near a selected pixel.

12. The method of claim 1, wherein applying the contrast transfer mapping to the second components produces modified second components of the luminance information and applying the contrast transfer mapping to the first components produces modified first components of the luminance information, and wherein the method further comprises:
    combining the modified first components and modified second components to produce modified luminance information.

13. The method of claim 12, further comprising:
    re-scaling the contrast transfer mapping by processing the contrast transfer mapping information such that the modified luminance information does not exceed an allowed range of luminance values.

14. The method of claim 13, wherein the contrast transfer mapping is re-scaled by applying a gain A and an offset B to the contrast transfer mapping information.

15. The method of claim 13, wherein a frame of video comprises the image, and wherein the contrast transfer mapping information is re-scaled from frame to frame of the video based on the modified luminance information.

16. The method of claim 15, further comprising:
    calculating local mean luminance values of the luminance information; and
    applying gain to the first components of the luminance information based on the local mean luminance values, wherein higher gain is applied to first components of the luminance information having more extreme corresponding local mean luminance values.

17. The method of claim 15, wherein the re-scaling is temporally controlled using negative feedback.

18. A method of processing an image comprising a plurality of pixels having luminance information associated therewith, the method comprising:
    processing the luminance information to generate first components of the luminance information and second components of the luminance information, wherein the first components correspond to a higher spatial frequency than that of the second components;
calculating local mean luminance values of the luminance information; and
applying gain to the first components of the luminance information based on the local mean luminance values, wherein applying the gain comprises applying a first gain to first components of the luminance information having a first luminance value, applying a second gain to first components of the luminance information having a second luminance value, and applying a third gain to first components of the luminance information having a third luminance value, wherein the second luminance value is higher than the first luminance value and the third luminance value is higher than the second luminance value, wherein the first gain is higher than the second gain and the third gain is higher than the second gain.

19. The method of claim 18, wherein each local mean luminance value is calculated by determining a mean value of the luminance information over a subset of pixels near a selected pixel.

20. The method of claim 18, wherein the gain is calculated using a cosine function.

21. A computer readable storage device having computer executable instructions, which, when executed, perform the method of claim 18.

22. A method of processing video comprising a plurality of images in frames of the video, the images each comprising a plurality of pixels having luminance information associated therewith, the method comprising:
applying a contrast transfer mapping to first luminance information for a first frame of the video;
calculating an error signal based on luminance information for the first frame and a second frame of the video;
re-scaling the contrast transfer mapping using the error signal to calculate a second contrast transfer mapping; and
applying the second contrast transfer mapping to second luminance information for the second frame of the video.

23. The method of claim 22, wherein the re-scaling is performed to reduce a change in contrast transfer mapping applied to subsequent frames of the video.

24. The method of claim 22, wherein the re-scaling is temporally controlled using negative feedback.

25. A computer readable storage device having computer executable instructions, which, when executed, perform the method of claim 22.

26. A device for processing an image comprising a plurality of pixels having luminance information associated therewith, the device comprising:
a sub-band separation module that separates the luminance information to generate first components of the luminance information and second components of the luminance information, wherein the first components correspond to a higher spatial frequency than that of the second components;
a contrast transfer mapping module that applies a contrast transfer mapping to the second components of the luminance information using contrast transfer mapping information; and
a contrast adaptive gain module that determines, based on the contrast transfer mapping information, whether to apply the contrast transfer mapping to the first components of the luminance information, and applies the contrast transfer mapping to the first components of the luminance information, when it is determined to do so.

27. The device of claim 26, wherein the contrast transfer mapping module determines whether to apply the contrast transfer mapping to the first components of the luminance information by calculating a slope of the contrast transfer mapping information for a corresponding luminance value of the image.

28. The device of claim 26, further comprising:
a mean-adaptive gain generation module that applies a gain to the first components of the luminance information based on local mean luminance values of the luminance information, wherein higher gain is applied to first components of the luminance information having more extreme corresponding local mean luminance values.

29. The device of claim 28, further comprising:
a frame-based detail boost module that re-scales the contrast transfer mapping by processing the contrast transfer mapping information, wherein a frame of video comprises the image, and wherein the contrast transfer mapping information is re-scaled from frame to frame of the video.

30. A device for processing an image comprising a plurality of pixels having luminance information associated therewith, the device comprising:
a sub-band separation module that separates the luminance information to generate first components of the luminance information and second components of the luminance information, wherein the first components correspond to a higher spatial frequency than that of the second components; and
a mean-adaptive gain generation module that applies a second gain to the first components of the luminance information based on local mean luminance values of the luminance information, wherein the mean-adaptive gain generation module applies the gain by applying a first gain to first components of the luminance information having a first luminance value, applying a second gain to first components of the luminance information having a second luminance value, and applying a third gain to first components of the luminance information having a third luminance value, wherein the second luminance value is higher than the first luminance value and the third luminance value is higher than the second luminance value, wherein the first gain is higher than the second gain and the third gain is higher than the second gain.

31. The device of claim 30, further comprising:
a local mean calculation module that calculates the local mean luminance values by determining a mean value of the luminance information over a subset of pixels near a selected pixel.

32. A device for processing video comprising a plurality of frames, the plurality of frames each comprising a plurality of pixels having luminance information associated therewith, the device comprising:
a sub-band separation module that separates the luminance information to generate first components of the luminance information and second components of the luminance information, wherein the first components correspond to a higher spatial frequency than that of the second components;
a contrast transfer mapping module that applies a contrast transfer mapping to the second components of the luminance information for a first frame of the video using first contrast transfer mapping information; and a frame-based detail boost module that calculates an error signal based on luminance information for the first and a second frame of the video and re-scales the contrast transfer mapping using the error signal to calculate a second contrast transfer mapping.

33. The device of claim 32, wherein the frame-based detail boost module performs re-scaling in a manner that reduces a change in the contrast transfer mapping applied to subsequent frames of the video to reduce flicker.

34. The device of claim 33, wherein the frame-based detail boost module performs re-scaling using negative feedback.

* * * * *

UNITED STATES PATENT AND TRADEMARK OFFICE
CERTIFICATE OF CORRECTION

PATENT NO. : 8,781,248 B2
APPLICATION NO. : 12/695220
DATED : July 15, 2014
INVENTOR(S) : Haiyun Wang et al.

Page 1 of 1

It is certified that error appears in the above-identified patent and that said Letters Patent is hereby corrected as shown below:

In the Specification

In column 7, line 50 "re-sealing" should be --re-scaling--.

Signed and Sealed this
Seventh Day of October, 2014

Michelle K. Lee
*Deputy Director of the United States Patent and Trademark Office*